Figure 1:
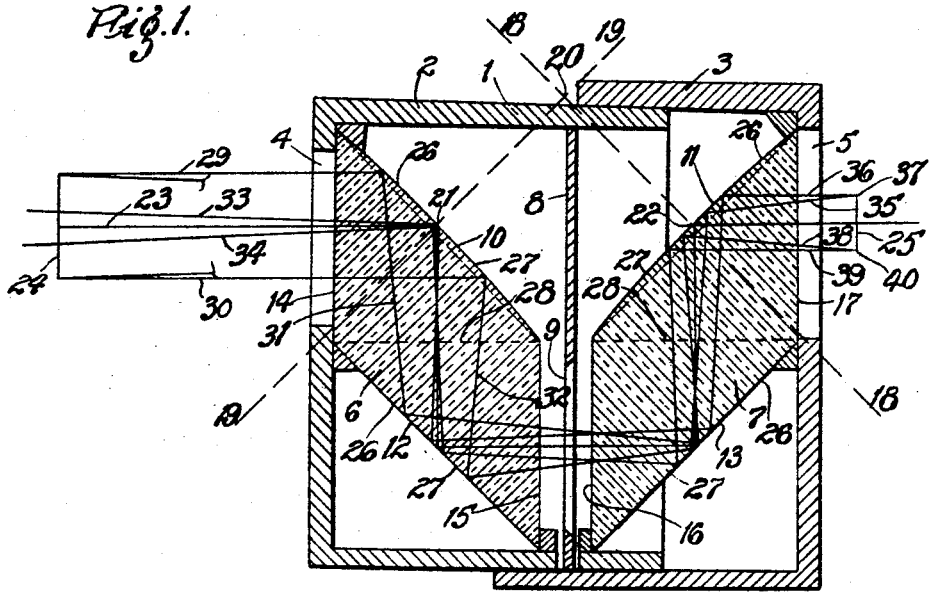

Feb. 10, 1925.

H. F. ROACH

OPTICAL INSTRUMENT

Filed Feb. 23, 1923

Inventor:
Harry F. Roach
By Bruce S. Elliott
Attorney

Patented Feb. 10, 1925.

1,525,658

UNITED STATES PATENT OFFICE.

HARRY F. ROACH, OF ST. LOUIS, MISSOURI.

OPTICAL INSTRUMENT.

Application filed February 23, 1923. Serial No. 620,636.

*To all whom it may concern:*

Be it known that I, HARRY F. ROACH, a citizen of the United States, residing in the city of St. Louis, and State of Missouri, have invented new and useful Improvements in Optical Instruments, of which the following is a specification.

This invention relates to optical apparatus in which an image is produced by means of reflecting elements. In my pending application, Serial No. 576,697, filed July 22, 1922, I have described and illustrated two forms of optical apparatus for this purpose, one of which is used to produce a normal true image, and the other an anamorphus image. In both forms of apparatus, mirrors are arranged for reflecting the light rays from the object to produce the image, and in both, the arrangement is such as to avoid having to place the object on the axis of the reflectors, thereby obviating the objection of having the object, or other element or elements of optics, interfere with the passage of the reflected light rays, as occurs when only a single collecting or focusing reflecting element is employed with the object on the axis of the reflecting element, which objection is characteristic of prior attempts to photograph by means of reflection instead of by the use of the lens system of an ordinary camera.

In the mirrors that are used in this prior apparatus, the reflecting surface is formed by silver placed directly upon the face of the material forming a mirror on which the light rays are designed to impinge; the silvered surface is thus exposed to the action of the atmosphere, with the result that the polish is destroyed in a relatively short time, and the silver coating itself becomes tarnished and useless, necessitating frequent resurfacing of the mirrors. In addition, the exposed silver surfaces are liable to become cloudy by the action of smoke, dust, and the like, which, in itself, impairs its usefulness, and the removal of which causes more or less abrasion or scratching of the surface, further impairing its reflecting quality and the accuracy thereof.

Notwithstanding these objections, said instrument represents, in my opinion, a pronounced advance in the art.

I have found, however, that the above objections may be overcome by the substitution of total reflecting prisms for the reflecting elements of my prior invention, when the same are prepared and arranged in the manner hereinafter set forth.

It is the object of my invention, therefore, to provide an optical instrument of simple and compact form for use in producing either a normal true or anamorphous image, or projection of light rays, in which the reflection of the light is effected by the use of total reflecting prisms, the reflecting surfaces of which are coated with silver, which, in turn, is covered by a coating, which protects the silver from contact with or action by deleterious foreign substances, or other injurious media, and the prisms being angularly disposed to produce successive reflections of the light rays in a manner to preserve an optical plane or axis of projection.

Reference may also be made to my pending application, Serial No. 611,570, filed January 9, 1923, in which total reflecting prisms are shown and described, having the same light-dispersing characteristics as the prisms of the present application. These prior total reflecting prisms, however, necessitate the use of an optical ray collecting instrument for purposes of the invention therein described.

An optical instrument constructed according to my invention, or involving the principles thereof, may be utilized in various ways and for various purposes, such as for microscopy, photography, or for any other optical purpose involving the transmission of light, such as exemplified by its use as a search-light. In its use for photographic purposes, the instrument may be used to magnify or reduce the image, and the image formed by the reflecting elements may be a true image or an anamorphus image, depending upon which form of the apparatus is employed. It will, of course, be understood that in either of the above uses referred to, the said instrument may be used as an objective or a projective instrument.

Primarily, the advantage of this instrument is that resulting from the employment of reflection instead of refraction to form an image. This advantage has been recognized in fine astronomical photography, but the difficulty heretofore has been to arrange a reflector so as to produce a reasonably true image of the object without the sacrifice of light, and without the presence of diffraction. In such prior attempts, an additional reflector is placed on the optical axes between the object and the mirror to direct the image onto a screen away from the initial optical axis. In this invention, the sacrifice of light does not exist, as two curved reflectors are used, one of which diverts the direction of the optical axis directly from the curved reflector onto two plane reflectors, and again back to the other curved reflector, the final optical axis of the image being coincident with the projection of the initial optical axis, or diverted to any selected angle thereto, dependent upon the angular relation of the reflecting elements to each other, and to the initial optical axis. At no time is there a reflector existing between the image and the optical instrument, so that all of the light is used that impinges upon the initial reflector. Further, where a reflector is located between the object and the optical instrument, the light from the object passing around the edges of the reflecting element, which edges are opaque, is diffracted, which injures the image. This element of error is not present in an instrument constructed according to my invention.

The invention is illustrated in the accompanying drawing, in which—

Figure 2:
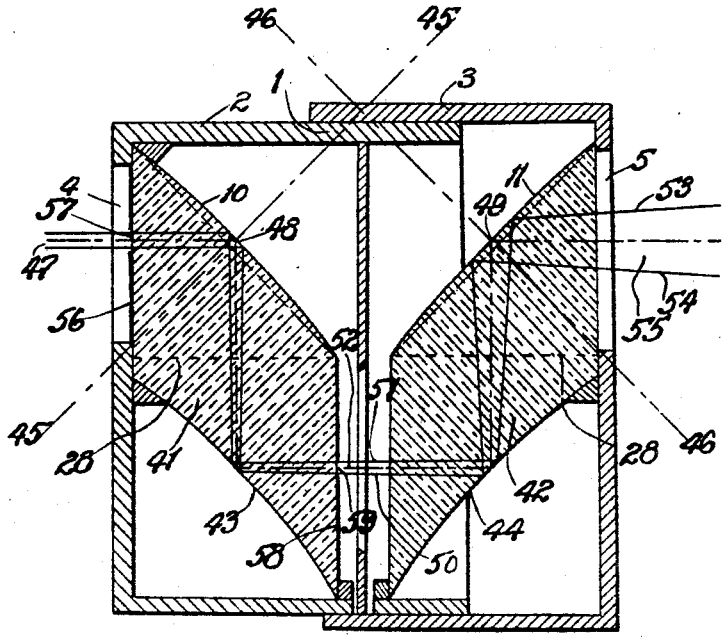

Figure 1 is a transverse sectional view through an instrument embodying my invention, the character and arrangement of the prisms being such as to produce a true image of an object; and Figure 2 is a similar view, the construction and arrangement of the prisms being such as to produce a balanced anamorphous image of the object, in which a very high degree of magnification may be effected in one direction.

Referring now to the drawing, the numeral 1 indicates a casing, composed of two rectangular members 2, 3, having a telescoping connection, and each of which is provided with an opening 4, 5, respectively, for the passage into and from the casing, of light rays. Referring to Figure 1, the numerals 6, 7 indicate, respectively, two total reflecting prisms, one of which is mounted in the member 2 of the casing, and the other in the member 3, the member 2 having mounted therein a diaphragm or stop 8 interposed between the opposed parallel faces of the prisms, which is provided with an opening 9, opposite said faces for the passage of the light rays.

Each of the prisms 6 and 7 is provided with a curved reflecting surface 10, 11, respectively, and an opposite flat reflecting surface 12, 13, respectively, and with two flat parallel faces at their front and rear ends indicated as to the prism 6 by the numerals 14, 15, and as to the prism 7 by the numerals 16, 17, respectively. In order to avoid what is known as "spherical aberrations" which occur in the use of spherical reflecting elements, I prefer to grind the curved reflecting surfaces 10 and 11 to the shape such as described by a conic section, for example, an ellipse, parabola or hyperbola, rotated about its axis, preferably the transverse axis; and of these I prefer the ellipsoidal form of reflecting surface for finite distance, which is that shown in the drawings, and the paraboloidal form for infinite distance. The two prisms 6 and 7 are so positioned in the casing 1 that the two flat reflecting surfaces 12 and 13 extend at the preferred angle of 45° to the horizontal, and the transverse axes 18 and 19 of the curved reflecting elements 10 and 11 are at an angle of 45° to the horizontal and intersect at an angle of 90° at the point 20. These axes are in the same plane and the distance from the point 20 to the optical center 21 of the curved reflecting surface 10 is equal to the distance from the point 20 to the optical center 22 of the curved reflecting surface 11, it being understood that by the term "optical center" I mean the point where the axis of the reflecting element passes through it.

By reason of the fact that the optical centers of the two reflecting elements are equidistant from the point 20, lines drawn through the prisms from the points 21 and 22 parallel with the flat faces 14, 17 of the prisms, will make equal angles with the reflecting surfaces 10, 11. The direction in which the beam of light impinges upon the reflecting surface 10 through the opening 4, should be substantially at right angles to these lines; that is to say, the medial axis or central ray of the beam should have the position indicated by the line 23, which may be regarded as the middle or central ray of a beam of light emitted from an object indicated at 24. With two total reflecting prisms positioned as described and shown in Figure 1, light rays from the object 24 will enter the opening 4 and impinge upon the ellipsoidal surface 10 whence they will be reflected to the side 12, thence through the opening 9 of the diaphragm 8 to the side 13, thence to the ellipsoidal surface 11, and thence out through the opening 5 to form the image 25. The sections 2, 3 of the casing may be moved to adjust the prisms to the proper distance apart to aid in securing a true image.

Inasmuch as it is well known that any foreign substance, such as moisture, dust, or the like, on the reflecting surface of a total reflecting prism impairs, to the point of destruction, the reflecting quality thereof, I preferably transfer the reflecting surfaces 10, 11, 12, 13 of the prisms to a silver surface by coating the same with silver of the greatest whiteness, such coating being indicated at 26 in each instance, and I protect the silver by coating the same, in turn, with a flat black substance, as indicated in each case by the numeral 27.

I am aware that in the optics of total reflecting prisms, the reflecting surfaces need no reflecting element placed on them to cause the prisms to properly function as total reflecting prisms, and further, that the placing of the reflecting element, such as silver, on these reflecting surfaces transfers the technical optical performance from that of a total reflecting prism to that of a prism whose total reflecting surface performs as a mirror. For practical reasons, however, it is preferable to place the reflecting medium on the reflecting surfaces, as this prevents any disturbance of the optical reflecting surface results, and also eliminates the necessity for the consideration of what is termed the "critical angle" in the pure total reflecting prism. Again, the use of total reflecting prisms with a reflecting medium, such as silver, placed on the optical reflecting surfaces, and a protection placed on the back of this reflecting medium, enables one to protect the reflecting medium against the effects of the weather, such as tarnishing; and mechanical disturbances, such as scratching; which, so far as the knowledge of the art today is known to me, cannot be accomplished in any form of construction or design other than as herein described.

Where the silver is placed on the exterior surface and functions in the manner common to mirrors, the ray impinges the silver and does not pass through the medium on which the silver is placed. Accordingly, the silver reflecting element of the mirror is subject to the effects of the elements, is easily tarnished, and is easily scratched. These are some of the fundamental and practical objections to the use of mirrors with the reflecting medium, silver, unprotected. These objections are overcome by the use of total reflecting prisms having a reflecting medium, such as silver, placed on the reflecting surfaces of the prisms, and protected.

Hence, the use of the term "total reflecting prisms" in the specification and claims is to be understood to include total reflecting prisms with or without a reflecting medium, such as silver, placed on the reflecting surfaces of the prisms.

As heretofore stated, the transverse axes of the curved surfaces 10 and 11 bear an angle of 90° to each other, and the flat reflecting surfaces 12 and 13 are at an angle of 90° to each other. The exact degree of angularity shown, however, is not essential except that when the prisms are used as pure total reflecting prisms, the angularity of the flat reflecting surfaces must not be such as to cause the desired rays to impinge these surfaces to within the critical angle of the material of which the prism is made, and the transverse axes of the curved surfaces must bear the same angle to each other as that of the flat reflecting surfaces when the angle is 90°. When the angle of the flat reflecting surfaces is other than 90°, the angle of the transverse axes of the curved reflecting surfaces must be a supplement of such angle.

The above described arrangement of total reflecting prisms assumes that no chromatic dispersion occurs in the passage of the light rays through the prisms, as the faces of the prisms at the entering and exit sides are parallel. There is authority for such assumption. In the event, however, it should be found, in use, that any degree of chromatic aberration occurs, this can be readily corrected by the employment of glasses of suitable indices of refraction at the entering and exit sides of the instrument, or otherwise, in a manner well known. My arrangement of total reflecting prisms lends itself readily to this adaptation, and also permits any desired number of corrections to be provided for, according to the number of prisms and glasses employed. Thus, as shown by the dotted lines 28, each of the prisms could be formed in sections having their meeting faces cemented together and each section of the prism could have a different index of refraction. As stated, however, I believe that no substantial chromatic aberration occurs, or, if it does occur, my experience is that it is so slight as to be practically negligible.

It will be understood, of course, that the flat reflecting surfaces 12 and 13 act merely to transmit the rays from one curved surface 10 to the other curved surface 11 and do not, in any manner, vary their relation.

It will be noted that in the operation of the reflecting surface 10, the beam of light is reflected away from the object. That is to say, it is reflected in a direction or line which will not pass through the object, or other element or elements of optics. Hence, the presence of the object, or other element or elements of optics, does not interfere, in any way, with the true functioning of the reflecting surfaces of the prisms. It should be understood that the image produced by the co-operation of the reflecting surfaces described, where no special means is employed for producing distortion, will be an orthoscopic image; this image is produced by pure reflection and hence, as indicated above, I avoid the difficulties incident to the refraction of light by a lens system, as in the ordinary camera.

One result of the described relation of the curved reflecting surfaces 10 and 11, is that a balanced effect is attained in the final reflected beam at the image. That is to say, of any two symmetrical rays in any plane other than one perpendicular to the optical axis reflected as between the curved reflecting surfaces in the incoming beam, that ray which has the higher angle of incidence on the first reflecting surface 10 will have the lower angle of incidence on the second reflecting surface 11. Hence, a ray represented by the line 29, which has the greater angle of incidence on the curved surface 10 will have the smaller angle of incidence on the curved surface 11, and vice versa. The ray 29 is supposed to be admitted as a parallel ray from the upper end of the object 24, while the ray 30 is a parallel ray from its lower end. These rays are symmetrically disposed with respect to the medial line or ray 23, and disposed in the plane in which the axes 18 and 19 lie. The ray 29 will be reflected down in a direction indicated by the line 31, and the ray 30 will be reflected down in a direction indicated by the line 32. By using two other lines, such as the lines 33 and 34, to represent two other rays from the upper and lower ends of the object, respectively, and impinging upon the optical center 21, the direction of the reflected rays may be drawn on the figure, and they will be disposed as indicated, so that the ray 33 will finally merge in the line 39, intersecting with a ray 38, corresponding to the ray 29. The intersection of these rays 38 and 39 will be at the lower end 40 of the image 25. In a similar manner, the resultant reflected rays 35 and 36 will correspond to the rays 30 and 34, and their intersecting point 37 will be at the top of the image 25.

If desired, the apparatus just described may be used to produce an enlarged image of the object, and the degree of magnification of this image will depend upon the distance between the reflecting surfaces 10 and 11, determined by moving the prisms a greater or less distance from each other.

Referring now to Figure 2, I show an arrangement and construction of prisms designed to produce an anamorphous effect. In this construction, I employ two total reflecting prisms 41 and 42, as before, each of which has a concave surface 10, 11 respectively, preferably in the form of an ellipsoid, as in the case of the prisms of Figure 1, and an opposite curved surface 43, 44, respectively, which is preferably convex and of cylindrical formation, having its geometrical elements disposed parallel to a given fixed axis. In other words, all the cross-sections through the prisms would have precisely the same form as those shown in Figure 2, and also the same dimensions. The reflecting surfaces 43 and 44 in cross-section may be circular, but preferably they are of a conic section such as an ellipse. That is to say, the intersection of the reflecting surface with the section plane illustrated, or any plane parallel to it, may be an ellipse.

The disposition of the curved reflecting elements relative to each other is the same as that described with reference to Figure 1, so that their axes 45 and 46 have the same relation as that described in connection with the axes 18 and 19 of Figure 1. Likewise, the transverse axes of the cylindrical deflecting surfaces 43 and 44 bear the same angle to each other as that of the axes 45 and 46, when the angle is 90°; and when the angle of the axes 18 and 19 is other than 90°, the angle of the axes of the cylindrical reflecting surfaces must be the same as the angle of the axes 18 and 19. Also, as in the case of the prisms of Figure 1, when the prisms 41 and 42 are used as pure total reflecting prisms, the angularity of the surfaces must not be such as to cause the desired rays to impinge these surfaces to within the critical angle of the material of which the prism is made. In this case also, the light beam 47 is admitted so that it impinges on the optical center 48 of the curved reflecting surface 10 in a direction inclined thereto, and is reflected onto the optical center 49 of the co-operating reflecting surface 11 in the form of a sheet of light through the intervention of the curved surfaces 43 and 44. The beam 47 is reflected from the reflecting surface 10, through the prism 41, substantially from the optical center 48 in the form of a beam 42 which is successively reflected on the reflecting surfaces 43 and 44. These reflecting surfaces also co-operate in such a way that of two symmetrical rays in any plane other than one parallel to the geometric axis of the curved reflecting surface cylinder in a beam, that ray which has the greater angle of incidence on the surface 43 will have the smaller angle of incidence on the opposite surface 44. This will be evident by an inspection of the indicated lines of reflection of two symmetrical rays 50 and 51, which are supposed to lie in the beam 52, as reflected from the curved surface 43. The effect of the reflecting surfaces 43 and 44 is to increase the divergence of two rays, such as the rays 50 and 51, and to co-operate with the reflecting surfaces 10 and 11 to produce an image which is a true image except for a magnification or anamorphous effect which is produced by the increasing divergence of the rays 50 and 51, for example, producing an angular relation between them, indicated by the lines 53 and 54. By this means, I am enabled to produce an anamorphous image having a very high degree of magnification of all dimensions in one direction, or parallel with a given axis.

At what I will term the entering side of the instrument, or that at the left of Figure 2, a protecting coating of flat black 56 is applied to the face of the prism at all except a given area destined to lie substantially centrally of the opening 4, which area provides an optical opening 57 symmetrical with the optical plane of the instrument and through which the rays of light pass through the prism 41 to the reflecting surface 10. The corresponding parallel face of prism 41 is also coated with flat black, as indicated at 58, except for a defined area constituting an optical opening 59. The whole interior of the casing 1, in the use of either form of prism, is also preferably coated with flat black to reduce the effect of any diffused light within the casing.

If desired, an instrument, such as that illustrated in Figure 2, may be used for enlarging photographs, or for producing anamorphous images or photographs, from normal photographs or objects. It is also evident that the instrument may be used to perform the functions of a microscope, in which the magnification occurs in one direction. It will also be obvious that by reflecting the emitted beam 55 again on two reflecting surfaces, such as the reflecting surfaces 43 and 44, but disposed with their axes at right angles to the axes of these surfaces, an equal magnification could be produced of the image in a plane at right angles to that in which the first magnification occurs. When used in this way, the instrument can function perfectly as a microscope. As in the case of Figure 1, the telescoping sections 2 and 3 may be moved to adjust the surfaces 10 and 11 at a greater or less distance from each other to aid in obtaining a true image.

It will be understood that in either form of apparatus, the direction of the beam of light may be reversed, if desired, and the same instrument may be utilized as an objective or projective instrument.

It is obvious that the optical instrument as illustrated in Figure 1 may be used for the projection of light rays to satisfy the purpose of such an instrument as a search light; and that the optical instrument used in Figure 2 may be used for the same purpose as the instrument of Figure 1, qualified, however, by the fact that the light in one axis is expanded in dimension to such a degree that the projection of the beam of light becomes that of a sheet of light.

I claim:

1. An optical instrument comprising a pair of total reflecting prisms, each of which is provided with a concave reflecting surface, said prisms being so positioned relative to each other that the concave reflecting surface of the one will receive and reflect light rays from an object impinging upon the concave reflecting surface of the other, and so that of any two symmetrical rays in any plane other than one perpendicular to the optical axis reflected as between the curved reflecting surfaces in the incoming beam, that ray which has the higher angle of incidence on the first reflecting surface will have the lower angle in incidence on the second reflecting surface.

2. An optical instrument comprising a pair of total reflecting prisms, each of which is provided with a reflecting surface of the shape of a conic section of revolution, the two prisms being so positioned relative to each other that the said reflecting surface of the one will receive and reflect light rays from an object impinging upon the corresponding reflecting surface of the other.

3. An optical instrument comprising a pair of total reflecting prisms, each of which is provided with two reflecting surfaces, one of which is concave, the relative angular disposition of said surfaces being such that light rays from an object impinging upon one of said concave surfaces will be transmitted to and reflected from the other concave surface to form a true image.

4. An optical instrument comprising a pair of total reflecting prisms, each of which is provided with two reflecting surfaces, one of which is concave, the angular disposition of said surfaces being such that light rays from an object impinging upon one of said concave surfaces will be transmitted to and reflected from the other concave surface to form an image, and the angle of impingement of the light rays upon each of the reflecting surfaces will be outside of the critical angle of the material of which the prism is composed.

5. An optical instrument comprising a pair of total reflecting prisms, each of which is provided with a pair of curved reflecting surfaces, one of which is concave and the other cylindrical, the said prisms being so positioned relative to each other that light rays from an object impinging upon one of said concave surfaces will be reflected in succession upon and from the two cylindrical surfaces and be received by and reflected from the second of the concave surfaces, whereby to produce an anamorphous image characterized by balanced distortion.

6. An optical instrument comprising a pair of total reflecting prisms, each of which is provided with two curved reflecting surfaces, one of which is the shape of a conic section of revolution and the other cylindrical, the two prisms being so positioned relative to each other that light rays from an object impinging on one of said surfaces having the shape of a conic section of revolution will be reflected upon and from the two cylindrical surfaces in succession, and be received by and reflected from the other surface having the shape of a conic section of revolution, whereby to produce an anamorphous image of the object characterized by balanced distortion.

7. An optical instrument comprising two total reflecting prisms, each of which is provided with two curved reflecting surfaces, one of which is concave and the other cylindrical, the prisms being so positioned relative to each other that the transverse axes of the cylindrical surfaces intersect and form an angle equal to the angle formed by the intersecting transverse axes of the concave surfaces, whereby light rays from an object impinging upon one of said concave surfaces will be reflected upon and from the two cylindrical surfaces in succession, and be received by and reflected from the other of said concave surfaces, whereby to form an anamorphous image characterized by balanced distortion.

8. An optical instrument comprising a pair of total reflecting prisms, each of which is provided with a concave reflecting surface, said prisms being so positioned relative to each other that the concave reflecting surface of the one will receive and reflect light rays from an object impinging upon the other, and means for adjusting the distance between the reflecting elements.

9. An optical instrument comprising a pair of total reflecting prisms, each of which is provided with a pair of curved reflecting surfaces, one of which is concave, the other of which is cylindrical and provided with integral diaphragms affording optical openings.

10. An optical instrument comprising a pair of total reflecting prisms, each prism having two reflecting surfaces, one in the form of a surface of revolution, and the other in the form of a cylinder, the reflecting surfaces of the prisms being angularly disposed to receive light rays and reflect the same as a sheet of light.

In testimony whereof, I have hereunto set my hand.

HARRY F. ROACH.